US012448666B2

(12) United States Patent
Tebeck et al.

(10) Patent No.: US 12,448,666 B2
(45) Date of Patent: Oct. 21, 2025

(54) SUSTAINABLE METHOD FOR RECYCLING SMELTING WORKS DUSTS AND SLUDGES TO PRODUCE IRON-CONTAINING, HEAVY-METAL-DEPLETED RECLAIMED MATERIALS WITH RECOVERY OF LEAD AND ZINC

(71) Applicant: ThyssenKrupp Steel Europe AG, Duisburg (DE)

(72) Inventors: Andreas Tebeck, Rheurdt (DE); Eckhard Pappert, Lünen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 576 days.

(21) Appl. No.: 17/798,709

(22) PCT Filed: Feb. 25, 2021

(86) PCT No.: PCT/DE2021/100193
§ 371 (c)(1),
(2) Date: Aug. 10, 2022

(87) PCT Pub. No.: WO2021/170181
PCT Pub. Date: Sep. 2, 2021

(65) Prior Publication Data
US 2023/0295765 A1  Sep. 21, 2023

(30) Foreign Application Priority Data
Feb. 28, 2020 (DE) .......................... 102020202575.4

(51) Int. Cl.
C22B 1/08 (2006.01)
C22B 1/24 (2006.01)
(Continued)

(52) U.S. Cl.
CPC .............. *C22B 1/08* (2013.01); *C22B 1/2406* (2013.01); *C22B 1/26* (2013.01); *C22B 19/26* (2013.01);
(Continued)

(58) Field of Classification Search
CPC ........... C22B 1/08; C22B 1/2406; C22B 1/26; C22B 19/26; C22B 19/30; C22B 7/02; C25C 1/16; C25D 3/22
See application file for complete search history.

(56) References Cited

U.S. PATENT DOCUMENTS 4,637,832 A * 1/1987 Cammi .................. C22B 19/26
                                                         75/724
6,500,229 B1   12/2002 Roux et al.

FOREIGN PATENT DOCUMENTS

CN     107151741 A     9/2017
CN     109402391   *   3/2019
(Continued)

OTHER PUBLICATIONS

Chinese Office Action for CN Application No. 202180017510.8 mailed Nov. 1, 2023.
(Continued)

*Primary Examiner* — Nicholas A Wang
(74) *Attorney, Agent, or Firm* — RMCK Law Group PLC

(57) ABSTRACT

The present invention relates to a sustainable regeneration process for metallurgical plant dusts and sludges for producing iron-containing, heavy metal-depleted secondary raw materials and recovering lead and zinc, by providing a first starting material which comprises at least one iron, zinc, lead and further heavy metal components containing metallurgical plant dust and/or sludge, and a second starting material containing at least one chlorine component, mixing the starting materials and drying the mixture, pyrolyzing the
(Continued)

mixture for expelling zinc, lead and further heavy metal components, capturing the gas phase of the pyrolysis in sulfuric acid, and providing the residue which remains as an iron-containing secondary raw material depleted in zinc, lead and further heavy metal components.

19 Claims, 1 Drawing Sheet

(51) Int. Cl.
  *C22B 1/26* (2006.01)
  *C22B 3/00* (2006.01)
  *C22B 19/30* (2006.01)
  *C25C 1/16* (2006.01)
  *C25D 3/22* (2006.01)
(52) U.S. Cl.
  CPC ............. *C22B 19/30* (2013.01); *C25C 1/16* (2013.01); *C25D 3/22* (2013.01)

(56) References Cited

FOREIGN PATENT DOCUMENTS

| | | |
|---|---|---|
| DE | 2624762 A1 | 12/1976 |
| DE | 69307515 | 11/1997 |
| GB | 813293 A | 5/1959 |
| GB | 1568362 A | 5/1980 |
| JP | H09241773 A | 9/1997 |
| JP | H10509212 A | 9/1998 |
| JP | 2004131755 A | 4/2004 |
| JP | 2007508226 A | 4/2007 |
| WO | 2018219464 A1 | 12/2018 |
| WO | 2019043261 A1 | 3/2019 |
| WO | WO2019043261 * | 3/2019 |

OTHER PUBLICATIONS

Hiroyuki Matsuura et al., "Removal of Zn and Pb from FE2O3—ZnFe2O4—ZnO—PbO Mixture by Selective Chlorination and Evaporation Reactions," ISIJ International, JP vol. 46, No. 8, Jan. 1, 2006.

International Search Report and Written Opinion for International Application No. PCT/DE2021/100193 mailed Jun. 7, 2021.

Pickles, et al., "Thermodynamics analysis of the selective chlorination of electric arc furnace dust," Journal of Hazardous Materials, Elsevier, Amsterdam, vol. 166, No. 2-3, Jul. 30, 2009.

Japanese Office Action for JP Application No. 2022-551328 mailed Mar. 4, 2025.

* cited by examiner

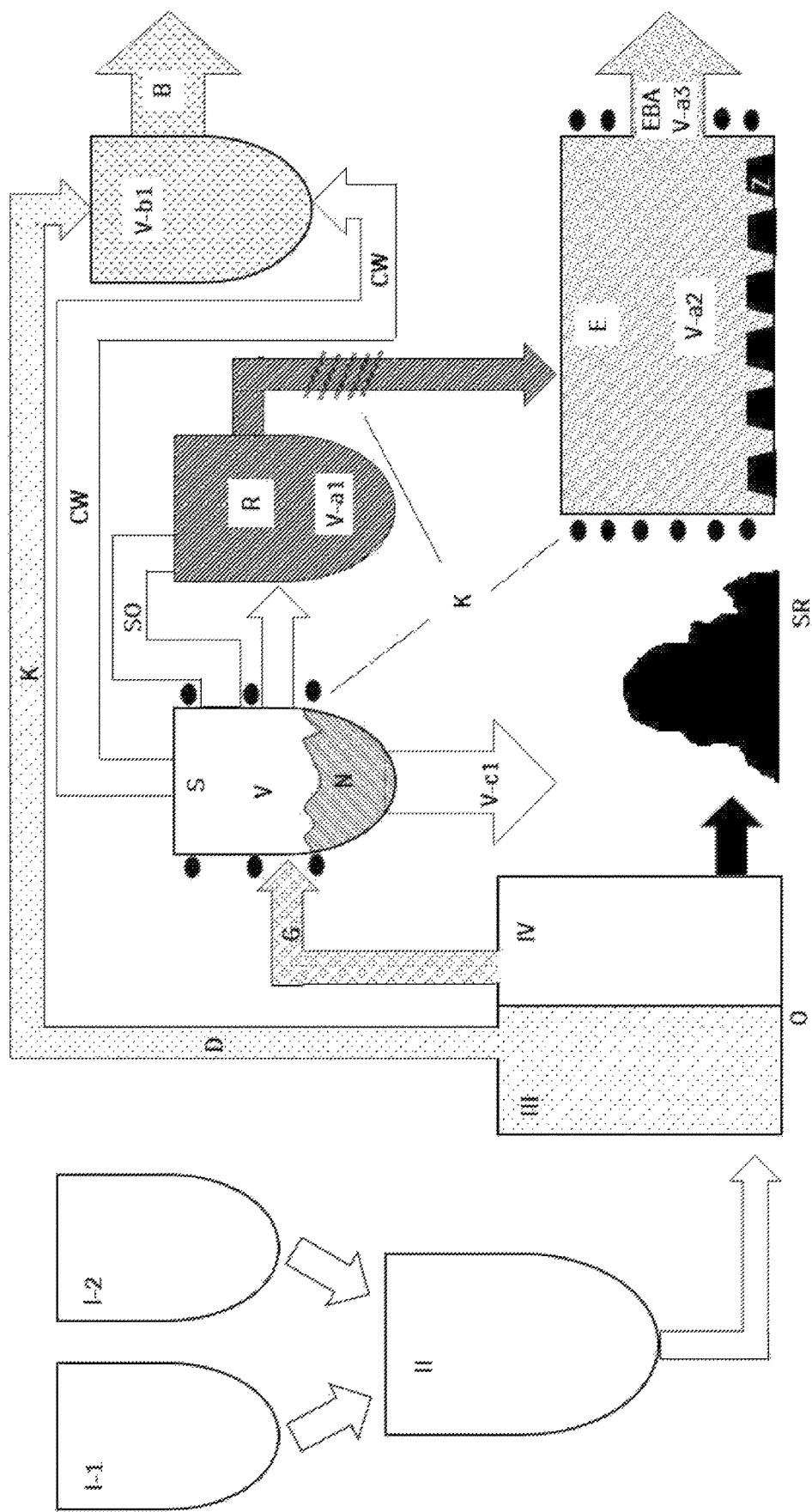

SUSTAINABLE METHOD FOR RECYCLING SMELTING WORKS DUSTS AND SLUDGES TO PRODUCE IRON-CONTAINING, HEAVY-METAL-DEPLETED RECLAIMED MATERIALS WITH RECOVERY OF LEAD AND ZINC

CROSS-REFERENCE TO RELATED APPLICATIONS

This application is a 371 U.S. National Stage of International Application No. PCT/DE2021/100193, filed Feb. 25, 2021, which claims the benefit of German Patent Application No. 10 2020 202 575.4 filed Feb. 28, 2020. The disclosures of each of the above applications are incorporated herein by reference in their entirety.

The present invention relates to a sustainable regeneration process for metallurgical plant dusts and sludges for producing iron-containing, heavy metal-depleted secondary raw materials and recovering lead and zinc, by providing a first starting material which comprises at least one iron, zinc, lead and further heavy metal component containing metallurgical plant dust and/or sludge, and a second starting material containing at least one chlorine component, mixing the starting materials and drying the mixture, pyrolyzing the mixture for expelling zinc, lead and further heavy metal components, capturing the gas phase of the pyrolysis in sulfuric acid, and providing the residue which remains as an iron-containing secondary raw material depleted in zinc, lead and further heavy metal components.

In metals production it is necessary in the future to intensify the regeneration or reuse of byproducts and recycling of wastes, in light of the substantial deployment of energy and resources, the substantial volumes of coproducts arising and emissions of climate-relevant gases, the rising prices for raw materials, costs of energy, waste and landfill, and emissions traded. One aspect in this connection is the regeneration of dusts, sludges and slags from pig iron and steel production, and also their further processing, as they contain significant quantities of valuable materials such as zinc and iron.

The recovery of iron components from blast furnace throat sludges is described in WO 2018/219464 A. Here, blast furnace throat sludge is admixed with an acid-containing solution so as to obtain separation into an acidic, aqueous, iron-rich phase and a carbon-rich phase. The iron component is isolated from the iron-rich phase in further steps such as oxidation and/or reduction.

The use of blast furnace throat sludge or other dusts from iron production is also known from WO 2019/043261 A. In this case, however, these byproducts of iron production are used as coreactants for the purification of wastes or industrial byproducts containing chlorine, more particularly from cement production. The two coreactants are reacted by thermal treatment. In a two-stage pyrolysis, $ZnCl_2$ is first expelled at temperatures up to around 700° C., and further removal of $ZnCl_2$ and $PbCl_2$ takes place at temperatures of 1000-1100° C. The $ZnCl_2$ solution obtained in this way is a mixed solution with $PbCl_2$ and further impurities. It remains a solid material, which is recycled substantially to cement production.

It is an object of the present invention to reprocess as many byproducts and waste products of iron and/or steel production as possible in an economical, sustainable process which is sparing of resources and effort. Within the process chains for iron and/or steel production, the intention is to make circuits available which allow the amount of primary raw materials to be reduced and which lead accordingly to a boosting of resource efficiency and keep valued substances within the economic cycle.

A further intention is to recycle technically and economically valuable materials into the materials circuit, in particular by way of internal materials circuits, through reuse, regeneration and recycling, while maintaining or improving the quality of the end products.

The intention as far as possible, moreover, is to reprocess different substances in a single, common process which does not require specific adaptation to individual substances. As a result the intention is to make regeneration economic even for substances which are present only at low concentrations in the starting materials.

The process, furthermore, is also to ensure regenerating of metallurgical plant dusts and sludges having a high heavy metal load, the disposal of which has to date been difficult and costly.

The economic viability, sustainability, and sparing approach to resources and/or effort in the process are ensured by one or combinations of two or more of the following criteria:

use of as small as possible a number of reactants, starting materials and materials for deployment that are not available as byproducts or waste products of iron and/or steel production.

Production of as small as possible a number of products which are costly and inconvenient to reuse or cannot be reused. Formation of as large as possible a number of products which are reusable, more particularly of products which can be used in iron and/or steel production or in the corresponding further processing. Avoidance of transport pathways. Production of products which as far as possible can be employed again directly with as few further operating steps as possible. Avoidance and reduction of costly and inconvenient operating steps. Boosting of the quantities of waste recycled, in conjunction with preservation of natural resources. Reduction in materials and/or energy deployment in the regeneration or recycling of substances, for boosting the use of secondary raw materials.

The object is achieved by a process having the features of claim 1.

The subject of the invention is therefore a regeneration process for producing iron-containing heavy metal-depleted secondary raw materials and recovering lead components and zinc components from metallurgical plant dust and/or sludge, comprising the steps of:

I) providing a first starting material which comprises at least one iron, zinc, lead and optionally further heavy metal components containing metallurgical plant dust and/or sludge, and a second starting material containing at least one chlorine component, II) mixing the first starting material with the second starting material, optionally transferring the mixture to an oven unit, and optionally subsequently pelletizing it, III) drying the mixture with expulsion of steam, and optionally subsequently pelletizing it, IV) reacting zinc, lead and further heavy metal components with the chlorine component to give chlorides, and expelling the chlorides and optionally zinc, lead and further heavy metal components by pyrolysis, V) capturing the gas phase from the pyrolysis from step IV) in sulfuric acid, optionally with cooling, VI) providing the pyrolysis residue which remains as an iron-containing secondary raw material depleted in zinc, lead and further heavy metal components.

In one embodiment the pyrolysis takes place under an atmosphere of inert gas. In an alternative the inert gas used comprises nitrogen N2. In a further alternative air or chlorine gas is additionally blown in. In the sense of the invention the term "pyrolysis" denotes the thermal decomposition of chemical compounds, in this case of the first and second starting materials, with subsequent reaction of the zinc, lead and further heavy metal components with the chlorine component to give chlorides.

The first starting material comprises at least one metallurgical plant dust and/or metallurgical plant sludge which comprises at least one iron component, at least one zinc component, at least one lead component and optionally at least one further heavy metal component. In one alternative the first starting material is a mixture of different substances, preferably a mixture of different metallurgical plant dusts and/or sludges. The first starting material is provided as a mixture, or the individual substances are first mixed in step II) with the second starting material.

In one embodiment the metallurgical plant dust and/or sludge used comprises at least one substance selected from the group containing or consisting of converter dust, coke dust, blast furnace dust, blast furnace sludge, dust from secondary metallurgy, sintering dust, mill scale, mill scale sludge, zinc slags, copper industry slags, oil-containing sludges, electric arc furnace dust (EAF dust), hall dusts from electric steel works, filter dusts, oxygen furnace dust, and blast furnace throat sludge, and also any desired combinations of 2, 3, 4, 5 or more of these substances. Preference is given to using the metallurgical plant dust and/or sludge from the secondary production of iron/steel, more preferably blast furnace throat sludge and/or oxygen furnace dust. In one alternative the metallurgical plant dust and/or sludge used is a blast furnace throat sludge which comes from a shaft furnace in which iron-containing metallurgical residues are already reused once, in other words in which dusts and sludges from the primary production of iron/steel are reused, more particularly a shaft furnace in which blast furnace sludge and/or converter residues are recycled. Hence, for example, the amount of throat sludge from a blast furnace in primary iron production can be reduced to around 25% through reuse in a shaft furnace. In this throat sludge, however, heavy metals in particular are enriched. In a further alternative, a so-called oxygen furnace dust, dust from a converter process, can be used which comes from an oxygen steelworks. The combination of the above-stated sludges and dusts as well is a further model.

In the sense of the present invention, the term "element component", such as, for example, iron, zinc, lead or heavy metal components or chlorine components, describes a constituent of the starting material that comprises the respective element, such as Fe, Zn, Pb or Cl, for example, independently of the form. The respective element in this case is present as an atom or ion or covalently bonded in a compound or a molecule, as a salt or oxide. Metals may be present in their metallic form.

In a further embodiment the chlorine component is at least one substance selected from the group containing or consisting of hydrogen chloride, hydrochloric acid, Cl2, PVC (polyvinyl chloride), PCB (polychlorinated biphenyls), PCT (polychlorinated terphenyls), oils containing PCB or PCT, preferably hydrochloric acid. In one alternative a used hydrochloric acid pickle is employed which comprises iron components and heavy metal components.

The second starting material as well may be present or provided as a mixture or combination of multiple substances, including at least one chlorine component. The second starting material is additionally provided in gaseous, solid or, preferably liquid form, more particularly as an aqueous solution or dispersion.

In the sense of the invention the term "heavy metal" describes a nonferrous metal (NF metal) having a density $\geq 5$ g/cm$^3$. A heavy metal of this kind is selected from the group containing or consisting of Pb, Zn, Cr, Cd, Co, Cu, Mn, Mo, Ni, Nb, V, Sn, Bi and As, preferably Pb, Zn, Cd, Sn and As.

In a second step of the process of the invention, the starting materials are mixed, preferably in a mixing unit. In one alternative the mixture is produced in a mixer, optionally in a heatable mixer, which enables drying and, optionally, pyrolysis.

In a further alternative the mixture is transferred to an oven unit. In the mixture the mass fraction of the iron component is at least 30%, preferably 50%, and the maximum mass fraction of the iron component is 95%, preferably 80%, 70%.

The stoichiometric ratio of the heavy metal components as described above, thus including Pb and Zn, to the chlorine component is at least 1:1 and not more than 1:2, preferably not more than 1:1.5.

In one alternative the mixture further comprises metal components selected from the group containing or consisting of Al, Ca and Mg components. These components may be introduced by the first and/or second starting material.

In one alternative the mixture is in the form of a paste, i.e., a dispersion with a high viscosity, hence as a solid-liquid mixture having a high solids content.

In one embodiment there is a granulating and/or pelletizing step before the transfer to an oven unit. The term "pelletizing" encompasses all methods known to the skilled person for producing individual solid agglomerates.

As the next process step III) the mixture is dried by expulsion of water at a temperature of at least 95° C., preferably at least 100° C., more preferably at least 105° C. and not more than 150° C., preferably not more than 130° C., more preferably not more than 120° C., more particularly not more than 115° C.

In one embodiment there is a granulating and/or pelletizing step before the pyrolysis.

In one embodiment the steam expelled during drying is condensed and the water is captured as fully desalified, demineralized water or distilled water.

In a further step IV) the dried mixture is pyrolysed at a minimum temperature of 900° C., preferably 950° C., more preferably 1000° C., more particularly 1050° C., and a maximum temperature of 1300° C., preferably 1250° C., more preferably 1200° C., more particularly 1150° C. As a result of the increase in temperature there is a reaction of zinc, lead and optionally further heavy metal components with the chlorine component to give chlorides. The chlorides formed in this way, and any further zinc components, lead components and optionally further heavy metal components, are expelled by the pyrolysis. Substantially in one alternative the pyrolysis expels chlorides of Al, As, Ca, Cd, Co, Fe, Mg, Mn, Pb, Sn and Zn. In this case there is a virtually quantitative sublimation of the chlorides of Cd, Co, Pb, Sn and Zn, while the chlorides of Al, As, Ca, Fe, Mg and Mn are expelled only to a low degree.

The gas phase expelled by the pyrolysis in step IV) is captured in a step V) in sulfuric acid, or introduced into sulfuric acid. The sulfuric acid has a concentration of at least 10%, preferably at least 30% and not more than 95-98%.

As a result of the capture of the gas phase of the pyrolysis in sulfuric acid:

V-A) a sulfuric acid solution is formed, containing zinc and optionally further heavy metals in the form of ions and optionally metals, V-B) PbSO4 is precipitated, and V-C) chloride ion is expelled as hydrogen chloride.

In the capture of the metal chlorides and any zinc components, lead components and optionally further heavy metal components, PbSO4 is precipitated as a solid (V-B), whereas the other metals present take the form of ions, in the sulfuric acid solution.

The sulfuric acid or the sulfuric acid solution from step V) has a minimum temperature of 80° C., preferably 85° C., more preferably 90° C., more particularly 95° C., and a maximum temperature of 170° C., preferably 150° C., more preferably 130° C., more particularly 110° C. This temperature is attained substantially by introduction of the hot gas phase from the pyrolysis; cooling of the solution/dispersion and/or of the corresponding container may be necessary.

At these temperatures, the chlorides are expelled in the form of hydrogen chloride. In one embodiment the hydrogen chloride gas is captured in water, i.e., is introduced into water to form hydrochloric acid in a step V-b1).

In the step VI) the pyrolysis residue which remains is provided as an iron-containing secondary raw material depleted in zinc, lead and optionally further heavy metal components. The pyrolysis residue which remains is more depleted in terms of zinc, lead and optionally further heavy metal components by comparison with the first starting material and/or with the mixture from step II); that is, the mass fraction of the zinc, lead and optionally further heavy metal components is smaller than the mass fraction of zinc, lead and optionally further heavy metal components in the first starting material and/or in the mixture from step II).

In one alternative the pyrolysis residue which remains is iron-enriched, meaning that the mass fraction of iron in the secondary raw material is larger than the mass fraction of iron in the first and/or second starting material and/or in the mixture from step II).

In a further embodiment, subsequent to step V), the sulfuric acid solution containing Zn and also optionally further metal components, more particularly heavy metal components, and in the form of ions, is heated, until the sulfuric acid fumes off, to a minimum temperature of 320° C., preferably 325° C., more preferably 330° C., more particularly 335° C., and a maximum temperature of 355° C., preferably 350° C., more preferably 345° C., more particularly 340° C. As a result the remaining chloride is removed in this step V-a1).

When the sulfuric acid fumes off, SO3 is also formed and expelled. In one alternative it is passed back to step V) or into the corresponding vessel. Accordingly a process for concentrating and/or purifying sulfuric acid is also provided.

In another embodiment the sulfuric acid solution containing Zn in the form of ions from step V-a1), i.e., a zinc sulfate solution containing sulfuric acid and chloride-depleted (substantially chloride-free), is transferred in a step V-a2) to a container with water and metallic zinc and optionally further sulfuric acid. In one alternative the sulfuric acid solution from step V-a1) is first cooled, or cooled on passage into the next container. In the container with metallic zinc, a part of the metallic Zn can be dissolved, and is present in the form of ions in the sulfuric acid solution. Hydrogen H2 which forms is optionally drawn off under suction. In one alternative, in step V-a2), heavy metals selected from the group containing or consisting of As, Cd, Pb and Sn, and also metals more noble than zinc, are deposited on the Zn surface by electrolytic cementation. Another variant of the heavy metal cementation takes place according to known processes from the hydrometallurgical purification of ZnSO4 solutions for producing zinc. The metallic zinc serves as a trace scavenger for the heavy metals.

In a further embodiment metallic zinc is produced by electrolytic reduction in a step V-a3) from the sulfuric acid solution containing Zn in the form of ions from step V-a2), after deposition of the other heavy metals.

In another embodiment the sulfuric acid solution containing Zn in the form of ions from step V-a2) is used, after deposition of the heavy metals, as an electrolyte in a zinc coating plant. The solution is suitable more particularly as an electrolyte in an electrolytic coil galvanizing plant ECP. Before being used as an electrolyte, the solution is optionally diluted to the desired zinc concentration, the corresponding pH is adjusted with sulfuric acid, and/or, depending on requirements, iron sulfate and/or sodium sulfate are added.

The resultant aqueous zinc sulfate electrolyte solution containing sulfuric acid, for electrolytic coil galvanizing plants, for example, is substantially free of heavy metal and/or chloride. A substantially chloride-free and/or heavy metal-free zinc sulfate solution containing sulfuric acid is, in the sense of the present invention, a solution which, with adjustment of the zinc concentration to around 100 g/l with a deviation of ±10 g/l, preferably ±5 g/l, more particularly ±3 g/l, has a concentration of each of Pb, Cd, Cr, Mo and/or Ni of <10 mg/liter, preferably <1 mg/liter, more preferably <0.5 mg/liter, more particularly <0.1 mg/liter and/or a chloride concentration of <100 mg/liter, preferably <50 mg/liter, more preferably <20 mg/liter, more particularly <10 mg/liter. This concentration is measured with the methods of chemical analysis that are known to the skilled person, more particularly by means of ICP-OES (optical emission spectrometer with inductively coupled plasma, Arcos from Spectro).

One embodiment relates to a step V-c1) in which PbSO4 is taken off as a solid from step V). In one alternative this PbSO4 precipitate from step V) is filtered.

In a further embodiment the chloride expelled in the form of hydrogen chloride in step V) is introduced into the water which has been condensed from the drying, step III), of expelled steam. In this case hydrochloric acid with a high chemical purity is synthesized, preferably with a technical grade or synthesis purity.

In one alternative a twenty percent strength hydrochloric acid, i.e., an aqueous, twenty percent (with a deviation of ±5%, preferably ±2%) strength HCl solution, is produced, which is used preferably as a pickle, more particularly in the working of steel.

A twenty percent strength solution of this kind has a concentration of one of the elements/components selected from the group containing or consisting of Al, As, Pb, B, Cr, Co, Fe, K, Cu, Mn, Mo, Na, Ni, Nb, P, Si, Ti, V, Zn and Sn of <1 mg/liter, preferably <0.5 mg/liter, more preferably <0.2 mg/liter, more particularly <0.1 mg/liter, and/or a concentration of one of the elements/components selected from the group containing or consisting of Ba, Be, Cd, Ca, Mg, and Sr of <0.1 mg/liter, preferably <0.05 mg/liter, more preferably <0.02 mg/liter, more particularly <0.01 mg/liter. This concentration is measured with the methods of chemical analysis known to the skilled person, more particularly by means of ICP-OES (Arcos instrument from Spectro).

In the sense of the invention, hydrogen chloride is gaseous, whereas hydrochloric acid is the aqueous solution of hydrogen chloride.

The invention therefore also provides a process for synthesizing hydrochloric acid, or for the direct synthesis of pickle, more particularly for steel processing.

One embodiment relates to the process of the invention in a continuous procedure. An alternative embodiment relates to the process of the invention in a discontinuous procedure, i.e., a batch operation. Depending on procedure, it is possible optionally for steps III) and IV), optionally V) and, as an option VI), to overlap temporally.

Another embodiment of the present invention relates to a process whose product is an iron-enriched, heavy metal-depleted secondary raw material having an adjusted basicity, allowing this secondary raw material to be used directly in steel production, more particularly in a blast furnace. For this purpose the mass fraction of CaO in the secondary raw material is at least 5%, preferably at least 10%, more preferably at least 10%, more particularly at least 20%, and not more than 40%, preferably 30%, more preferably 20%, more particularly not more than 15% necessary. This is by admixing CaO to at least one of the starting materials or mixture thereof. In one alternative Ca is admixed as a Ca component also in another form, in order ultimately to obtain CaO in the secondary raw material. CaO is formed from Ca-containing substances during the pyrolysis in the presence of oxygen from, for example, iron oxides.

In one alternative CaO is admixed to the second starting material, more particularly if that material is an aqueous solution of hydrochloric acid. CaO can be advantageously admixed accordingly into a liquid starting material containing at least one Cl component.

In a further embodiment the process of the invention as described above provides an iron-enriched secondary raw material. In this embodiment, therefore, the mass fraction of iron in the secondary raw material is larger than the mass fraction of iron in the first and/or second starting material.

One embodiment of the present invention relates to a process in which at least one starting material, preferably the first starting material, comprises at least one alkali metal component. The term "alkali metals" encompasses the metals from the first main group of the Periodic Table; the invention relates preferably to the alkali metals Na and K, and also, corresponding to the term "component" as defined above, substances and compounds containing Na and/or K in desired form. The process of the invention removes alkali metal components from the starting materials as well, together with zinc components and further heavy metal components. The alkali metal components are expelled from the starting material by pyrolysis in step IV), in step V) form ions in the sulfuric acid solution, and remain in this form in the sulfuric acid solution up to and including step V-a2). In the electrolytic cementation, the alkali metal ions are not deposited, but instead remain in the solution. Where sulfuric acid solution containing Zn in the form of ions is used as electrolyte, alkali metal ions and/or components are not disruptive.

The invention therefore also relates to an alkali metal component-depleted secondary raw material. The mass fraction of alkali metal components in the secondary raw material is smaller than the mass fraction in the first and/or second starting material.

The process of the invention meets all of the stated objects and offers the following advantages over the processes known to date from the prior art:
   the process of the invention can be used in particular to regeneration metallurgical plant dusts and sludges which as first starting material have a high heavy metal loading, more particularly a mass fraction of Pb components of at least 0.02%, preferably at least 0.05%, more preferably 0.1%, more particularly 0.5%, and a maximum mass fraction of 10%, 8%, 6%, preferably 4%, 3%, more preferably 2%, and/or a mass fraction of Zn components of at least 0.5%, preferably 1.0%, more preferably 2.0%, more particularly 5%, and a maximum mass fraction of 30%, 20%, preferably 18%, 15%, more preferably 12%.

With the process known from the prior that produces a mixed solution of ZnCl2 and PbCl2 with further impurities, Pb and Zn cannot be separated entirely. Tests have shown that the Pb component in the form of Pb(OH)2 is not quantitatively separated from a hydrochloric acid solution by adjustment of the pH to 2 using NH4OH. The Pb components in the form of PbS are also not precipitated quantitatively with ammonium sulfide. Furthermore, ZnCl2 also cannot be separated quantitively from lead components by concentration using an ion exchanger. Additionally, the chloride carrier cannot be recovered as regenerated hydrochloric acid. In contrast to this, the process of the invention enables a virtually or complete separation of Pb and Zn. In other words, separation of Pb and Zn takes place to an extent of at least 95%, preferably 98%, more preferably 99%, more particularly 99.9%. This means that in the case, for example, of a separation of only 99.9% in the sulfuric acid solution containing zinc in the form of ions, the mass fraction of Pb detectable with the usual analytical methods is only 0.1% (more particularly by means of ICP-OES (Arcos instrument from Spectro)).

The pure hydrochloric acid synthesized can be reused directly.

Large quantities of zinc are reprocessed and supplied for further use and operations. Produced in particular are zinc electrolyte solutions containing sulfuric acid that are suitable directly or possibly after addition of further substances for electrolytic coil coating plants.

The process of the invention ensures a recycling rate of at least 95%, preferably 97%, 98%, more preferably 98.5%, 99%, more particularly 99.5%, 99.9%. The recycling rate here is formed as a ratio of the mass of PbSO4 to the mass of the first starting materials used.

The secondary raw material produced can be used in the sintering plant and/or in the blast furnace directly.

With the process of the invention, zinc components and lead components, and also sodium components and potassium components, are depleted selectively in the secondary raw material in relation to the first starting material. Further elements/components, selected from the group containing or consisting of Al, Ca, Mg, Mn, P, S and Si, or combinations thereof, are unaffected or affected little. This means that the mass fraction of the latter elements/components changes only by not more than 1%, preferably 0.5%, more preferably 0.3%, more particularly 0.2%.

EXAMPLES

1. Comparison of the chemical analysis of blast furnace throat sludge with the secondary raw material after the pyrolysis:
   Blast furnace throat sludge from primary steel production was reused, admixed with hydrochloric acid pickle, dried at around 110° C. for 60 minutes and subjected to pyrolysis at around 1100° C. for 30 minutes in an oven unit (laboratory scale). The pyrolysis residue remaining is the secondary raw material. Chemical analysis of the throat sludge used and of the secondary raw material was carried out by means of ICP-OES (Arcos instrument from Spectro). The results are collated in tab. 1:

TABLE 1

| Component | | Throat sludge | Residue after pyrolysis |
|---|---|---|---|
| Al | [mass %] | 3.0 | 3.0 |
| Pb | [mass %] | 1.7 | <0.02 |
| Ca | [mass %] | 5.0 | 5.2 |
| Fe | [mass %] | 7.0 | 26.2 |
| K | [mass %] | 3.5 | 1.7 |
| C | [mass %] | 9.8 | 4.6 |
| Mg | [mass %] | 2.4 | 2.3 |
| Mn | [mass %] | 0.79 | 0.93 |
| Na | [mass %] | 1.3 | 0.8 |
| P | [mass %] | 0.11 | 0.14 |
| S | [mass %] | 1.11 | 1.15 |
| Si | [mass %] | 14.6 | 14.9 |
| Zn | [mass %] | 10.8 | 0.25 |

2. Comparison of the chemical analysis of oxygen furnace dust with the secondary raw material after the pyrolysis:

Example 2 was carried out in analogy to example 1. The results of the analysis are collated in tab. 2

TABLE 2

| Component | | Oxygen furnace dust | Residue after pyrolysis |
|---|---|---|---|
| Al | [mass %] | 0.21 | 0.22 |
| Pb | [mass %] | 0.051 | <0.005 |
| Ca | [mass %] | 4.4 | 4.4 |
| Fe | [mass %] | 62.2 | 62.5 |
| K | [mass %] | 0.22 | 0.001 |
| C | [mass %] | 1.0 | 0.02 |
| Mg | [mass %] | 0.56 | 0.56 |
| Mn | [mass %] | 0.65 | 0.68 |
| Na | [mass %] | 0.39 | 0.004 |
| P | [mass %] | 0.062 | 0.064 |
| S | [mass %] | 0.18 | <0.001 |
| Si | [mass %] | 0.65 | 0.65 |
| Zn | [mass %] | 2.3 | 0.18 |

From the results of tables one and two it is evident that the secondary raw material provided is a significantly lead- and Zn-depleted secondary raw material. This raw material, furthermore, is also more depleted of sodium components and potassium components.

3. Chemical analysis was performed on an around twenty percent strength HCl solution produced in accordance with the invention. The results are collated in tab. 3.

TABLE 3

| Al, As, Pb, B, Cr, Co, Fe, K, Cu, Mn, Mo, Na, Ni, Nb, P, Si, Ti, V, Zn, Sn | [mg/l] | <0.10 |
|---|---|---|
| Ba, Be, Cd, Ca, Mg, Sr, | [mg/l] | <0.01 |

From these results it is clearly evident that the hydrochloric acid solution provided is of high quality and high purity.

4. Separation of Pb and Zn from PbCl2/ZnCl2-containing solutions:

Blast furnace throat sludge was dissolved in hydrochloric acid on a laboratory scale.
 a) The pH of the solution was adjusted to pH 2. PbS was precipitated with ammonium sulfide. Analysis of the precipitated sulfides returned 1270 mg/l Pb and 790 mg/l Zn; analysis of the filtrate returned 83 mg/l Pb and 7200 mg/l Zn.
 b) Ion exchangers: Lewatit exchanger resins were used and were deployed in accordance with manufacturer information.
  b-1): Lewatit M 500
   Analysis of the starting solution returned 550 mg/l Pb and 6600 mg/l Zn; in the regenerated material, 90 mg/l Pb and 3200 mg/l Zn were measured.
  b-2): Lewatit TP 207
   Analysis of the starting solution returned 120 mg/l Pb and 3700 mg/l Zn; in the regenerated material, 920 mg/l Pb and 3100 mg/l Zn were measured.

The results show that quantitative separation of Pb and Zn from PbCl2/ZnCl2-containing solutions is not possible; in particular it is not possible to generate a Pb-free ZnCl2 solution.

5. Cementation of heavy metals:

2500 g of blast furnace throat sludge were used as starting material in the process of the invention and were reacted as described above in the further steps. The heavy metal concentration before and after the cementation (step V-a2)) was determined as described above. The result is collated in the table:

| | Starting solution | after cementation |
|---|---|---|
| As | <1 mg/l | <1 mg/l |
| Bi | 50 mg/l | <1 mg/l |
| Cd | 28 mg/l | <1 mg/l |
| Co | 0.7 mg/l | <0.1 mg/l |
| Cu | 6 mg/l | <0.1 mg/l |
| Ni | 3.5 mg/l | <0.2 mg/l |
| Pb | 110 mg/l | <1 mg/l |
| Sn | 96 mg/l | <0.1 mg/l |
| Zn | 11 g/l | 100 g/l |

The results show that a Pb-free ZnSO4 solution is produced with the process of the invention.

6. Comparison of the chemical analysis of oxygen furnace dust with the secondary raw material after the pyrolysis on a pilot (kg) scale:

A homogeneous mixture of 100 kg of oxygen furnace dust and 20 L of a hydrochloric acid pickle used in steel production was produced and dried at 105° C. to generate a flowable material. The pyrolysis was carried out under N2 inert gas in an indirectly heated rotary furnace.

| | | Oxygen furnace dust | Dried mixture oxygen furnace dust + HCl pickle |
|---|---|---|---|
| Al | [mass %] | 0.12 | 0.10 |
| Pb | [mass %] | <0.005 | <0.005 |
| Ca | [mass %] | 6.3 | 4.7 |
| Fe | [mass %] | 82.7 | 83.4 |
| K | [mass %] | 0.032 | 0.023 |
| C | [mass %] | 1.7 | 1.6 |
| Mg | [mass %] | 0.11 | 0.12 |
| Mn | [mass %] | 0.20 | 0.17 |
| Na | [mass %] | 0.042 | 0.031 |
| P | [mass %] | 0.064 | 0.058 |
| S | [mass %] | 0.019 | 0.012 |
| Si | [mass %] | 0.62 | 0.87 |
| Zn | [mass %] | 0.25 | 0.20 |

The pyrolysis was carried out at 3 different temperatures with residence times of 20, 40, 60 and 90 minutes in each case.

|    |          | 1000° C. | 1050° C. | 1100° C. |
|----|----------|----------|----------|----------|
| Al | [mass %] | 0.10     | 0.10     | 0.12     |
| Pb | [mass %] | <0.005   | <0.005   | <0.005   |
| Ca | [mass %] | 4.5      | 4.6      | 5.1      |
| Fe | [mass %] | 87.9     | 88.5     | 87.2     |
| K  | [mass %] | 0.0020   | 0.0015   | 0.0014   |
| C  | [mass %] | 0.58     | 0.64     | 0.49     |
| Mg | [mass %] | 0.12     | 0.12     | 0.16     |
| Mn | [mass %] | 0.19     | 0.19     | 0.24     |
| Na | [mass %] | 0.0018   | 0.0011   | 0.0008   |
| P  | [mass %] | 0.062    | 0.063    | 0.070    |
| S  | [mass %] | 0.018    | 0.017    | 0.020    |
| Si | [mass %] | 0.95     | 1.23     | 1.70     |
| Zn | [mass %] | 0.008    | 0.006    | 0.005    |

The major proportion of the alkali metal chlorides and heavy metal chlorides had been expelled after just 20 minutes at 1000° C.; increases in the residence time and temperature, respectively, produced minor improvements.

Comparison of the Depletion Rates:

| Element | Laboratory test 1100° C. | Pilot 1100° C. |
|---------|--------------------------|----------------|
| K       | 99.5%                    | 95.7%/99.1% (60 min.) |
| Na      | 99.0%                    | 98.1%          |
| Pb      | 98.0%                    | Amount too low |
| Zn      | 97.7%                    | 98.0%          |

From the table it is evident that with the same temperature, the depletion rates for the elements K, Na and Zn are comparable for the laboratory test (g scale) and the pilot test (kg scale). On average the amounts of these elements were reduced by 98.4%. Since the Pb content in the test material on the pilot scale was too low (<0.005% Pb), it was not possible to draw a comparison with the laboratory tests for this parameter.

BRIEF DESCRIPTION OF THE DRAWING

The invention is elucidated in more detail below with reference to FIG. 1. Represented schematically in detail is the process of the invention; the steps in accordance with the description, and the containers in which the respective steps are carried out, are identified using the same symbols.

As step I, the first starting material I-1 and the second starting material I-2 are provided from the respective container. In step II the starting materials are mixed in the corresponding container II. An oven unit is symbolized by III and IV. This unit may consist of two different or of one single container or oven, etc. Carried out therein are the drying step III and also the pyrolysis step IV.

During drying, steam D is expelled. It is subsequently condensed in a steam condenser K and collected as water in the container with the identification V-b1.

The gas phase G of the pyrolysis IV is captured in step V in sulfuric acid S, optionally with cooling K. In this operation, PbSO4 is precipitated as precipitate N. Precipitate is taken off in step V-c1, and optionally filtered.

In step V-a1 the sulfuric acid solution containing zinc in the form of ions is heated until the sulfuric acid fumes off R. In this way the residues of chlorine components are also expelled. These sulfur oxides and optionally further gases are passed back into step or container V.

Additionally, expelled in step V is hydrogen chloride, which is mixed together with the water condensed from steam in step or container V-b1 to give an aqueous hydrochloric acid solution. This solution can be used further as a pickle B in the working of steel.

Sulfuric acid solution containing zinc in the form of ions from step V-a1 is transferred, optionally with cooling K, to a further container V-a2. Located therein is zinc as solid Z and also water, and optionally there is also addition of further sulfuric acid. Here, optionally with cooling K, heavy metals selected from the group containing As, Cd, Pb and Sn are deposited on the Zn surface by electrolytic cementation E.

The resulting aqueous zinc sulfate solution, containing sulfuric acid and depleted in heavy metal and/or in chloride (substantially heavy metal-free and/or chloride-free), can be used as an electrolyte in an electrolytic coil galvanizing plant ECP.

Alternatively pure zinc is produced by electrolytic reduction in a step V-a3). The secondary raw material SR, as the pyrolysis residue which remains, is used further in a sintering plant or in the blast furnace.

In the sense of the invention, it is also possible to use combinations of the above-described embodiments and alternatives.

The invention claimed is:

1. A regeneration process for producing iron-containing heavy metal-depleted secondary raw materials and recovering lead components and zinc components from at least one of metallurgical plant dust and sludge, comprising the steps of:
   I) providing a first starting material which comprises at least one of iron, zinc, and lead, and a second starting material containing at least one chlorine component,
   II) mixing the first starting material with the second starting material, transferring the mixture to an oven unit, and subsequently pelletizing it,
   III) drying the mixture with expulsion of steam, and subsequently pelletizing it,
   IV) reacting zinc, lead and further heavy metal components and chlorine components by pyrolysis,
   V) capturing the gas phase from the pyrolysis from step IV) in sulfuric acid, with cooling,
      V-a1) subsequent to step V) the sulfuric acid solution containing Zn in the form of ions is transferred to a further vessel and heated for removing residual chloride until the sulfuric acid fumes off,
      V-a2) the sulfuric acid solution containing Zn in the form of ions from step V-a1) is cooled and transferred to a container with water, sulfuric acid and metallic zinc,
      V-c1) PbSO4 from step V) is taken off as a solid,
   VI) providing the pyrolysis residue which remains as an iron-containing secondary raw material depleted in zinc, lead and further heavy metal components.

2. The process of claim 1, wherein SO3 is formed and expelled in step V-a1) and is one of captured and returned to step V) or into a corresponding vessel.

3. The process of claim 2 wherein in step V-a2) heavy metals selected from the group containing As, Cd, Pb and Sn are deposited on the Zn surface by electrolytic cementation.

4. The process of claim 3 wherein pure zinc is produced by electrolytic reduction in a step V-a3) from the sulfuric acid solution containing Zn in the form of ions from step V-a2).

5. The process of claim 3, wherein the sulfuric acid solution containing Zn in the form of ions in step V-a2), after deposition of the heavy metals, is used as an electrolyte in a zinc coating plant.

6. The process of claim 5 wherein hydrogen chloride is expelled in step V and subsequent to step V) the hydrogen chloride expelled is introduced into water in a step V-b1) to form hydrochloric acid.

7. The process of claim 6 wherein the PbSO4 taken off as a solid in step V-c1) is filtered.

8. The process of claim 7 wherein the metallurgical plant dust and/or sludge used comprises at least one substance selected from the group containing converter dust, coke dust, blast furnace dust, blast furnace sludge, dust from secondary metallurgy, sintering dust, mill scale, mill scale sludge, zinc slags, copper industry slags, oil-containing sludges, electric arc furnace dust (EAF dust), hall dusts from electric steelworks, filter dusts, oxygen furnace dust and blast furnace throat sludge.

9. The process of claim 8 wherein as chlorine component at least one substance selected from the group containing hydrogen chloride, hydrochloric acid, Cl2, PVC, PCB, PCT, oils containing PCB or PCT, preferably hydrochloric acid, more preferably hydrochloric acid pickle is used.

10. The process of claim 9 wherein the steam expelled in step III) is condensed and the water is captured.

11. The process of claim 10, wherein the hydrogen chloride expelled is introduced into the water condensed from the steam, and is used as regenerated hydrochloric acid.

12. The process of claim 11 wherein the process is carried out one of continuously or discontinuously.

13. The process of claim 11 wherein the basicity of the iron-enriched, heavy metal-depleted secondary raw material is adjusted by admixing CaO to at least one of the starting materials or mixture thereof.

14. The process of claim 13 wherein the secondary raw material from step VI) is iron-enriched.

15. The process of claim 14 wherein at least one starting material comprises alkali metal components and the secondary raw material is alkali metal component-depleted in comparison to the starting material, with the alkali metal components passing through the process together with the zinc and further heavy metal components.

16. The process of claim 8 wherein the metallurgical plant dust and/or sludge used comprises at least one substance selected from the group containing metallurgical plant dust and/or sludge from secondary iron/steel production.

17. The process of claim 8 wherein the metallurgical plant dust and/or sludge used comprises at least one substance selected from the group containing blast furnace throat sludge and/or oxygen furnace dust.

18. The process of claim 9 wherein the chlorine component includes hydrochloric acid pickle.

19. The process of claim 1 wherein the first starting material further comprises heavy metal components containing metallurgical plant dust and/or sludge.

* * * * *